United States Patent [19]

Hormanns

[11] 4,278,487
[45] Jul. 14, 1981

[54] METHOD OF ENGAGING A SELF-CLAMPING SEALING STRIP ON A RETAINING FLANGE

[75] Inventor: Rolf Hormanns, Hamburg, Fed. Rep. of Germany

[73] Assignee: Schlegel GmbH, Fed. Rep. of Germany

[21] Appl. No.: 13,054

[22] Filed: Feb. 21, 1979

[30] Foreign Application Priority Data

Feb. 20, 1978 [DE] Fed. Rep. of Germany ....... 2807115

[51] Int. Cl.³ .................. C09J 5/02; B32B 3/04; C09J 7/02
[52] U.S. Cl. .................. 156/305; 156/307.3; 156/307.7; 156/308.2; 156/308.4; 156/308.6; 156/324.4; 428/122; 428/346; 428/358
[58] Field of Search ............... 428/31, 122, 346, 358; 156/307, 308, 305, 307.3, 307.7, 308.2, 308.4, 308.6, 324.4

[56] References Cited

U.S. PATENT DOCUMENTS

| 2,498,831 | 2/1950 | Veitch | 156/308.4 |
|---|---|---|---|
| 2,928,201 | 3/1960 | Shanok et al. | 428/31 |
| 3,380,582 | 4/1968 | Moyer, Jr. et al. | 428/346 |
| 3,394,044 | 7/1968 | Bright | 428/122 |
| 3,545,157 | 12/1970 | Cziptschirsch | 428/122 |
| 3,586,568 | 6/1971 | Campbell | 156/308 |
| 3,632,467 | 1/1972 | Todd et al. | 428/346 |
| 3,718,518 | 2/1973 | Boch et al. | 156/308 |
| 3,837,984 | 9/1974 | Wagner et al. | 428/31 |
| 4,059,473 | 11/1977 | Okami | 156/308 |

*Primary Examiner*—Thomas J. Herbert, Jr.
*Attorney, Agent, or Firm*—Cumpston & Shaw

[57] ABSTRACT

A solvent which evaporates without leaving any adhering residue behind is used as a lubricant in the engagement of a clamping sealing strip on a retaining flange. At least some of the strip surface engaging the flange is made of a substance softened by the solvent and therefore enters into an intimate and possibly adhesive engagement with the flange. The strip can therefore be readily bent, yet sticks reliably.

13 Claims, 4 Drawing Figures

METHOD OF ENGAGING A SELF-CLAMPING SEALING STRIP ON A RETAINING FLANGE

DESCRIPTION

Sealing or draught strips for motor vehicles can of course be stuck to the retaining bodywork surface. For this purpose an adhesive is applied thereto and to the associated strip surface, and after the adhesive has dried the parts are united. A disadvantage of connecting a sealing strip to bodywork in this way is that the adhesive is visible on the bodywork laterally of the zone covered by the strip and mars the appearance of the bodywork. Also, a stuck connection of this kind is limited to connections in which there is a large superficial area on one side and the adhesive-treated parts can be brought together by a movement transversely of the connection surface, for surfaces having a part-dried adhesive cannot of course be moved one above another parallel to the plane of the connection.

Channel-section sealing strips are therefore not stuck but are secured on their flange by clamping. They are therefore self-clamping devices and accordingly have a resilient steel insert. Those surface regions of the strip which co-operate with the flange are devised to adhere very strongly and are made, for instance, of a soft material having inwardly extending lips, the security of retention depending upon the clamping force. Unfortunately, the force required to assemble the strip on the flange increases in accordance as the clamping force increases. Consequently, so that sealing strips having a considerable clamping force may be used, it is often the custom in the motor vehicle industry to treat the flange with a lubricant before the clamping strip is engaged on the flange. However, the conventional lubricants have a relatively long evaporation time, with the result that the lubricant residues left between the flange and the strip detract from the reliability of strip retention in the early period of the vehicle's working life.

Another disadvantage of self-clamping sealing strips is their relatively high cost, since the production and fitting of the resilient steel inserts and the careful shaping of the strip surface co-operating with the flange are expensive.

It is, therefore, an object of the invention to improve a method of engaging a self-clamping channel-section sealing strip on a retaining flange, more particularly of a motor vehicle, the flange previously being wetted by a liquid lubricant, so as to ensure more reliable retention of the strip on the flange.

According to the invention, therefore, the liquid lubricant used is a solvent, producing surface or shallow dissolution of the strip material in the surface region which will subsequently engage on the flange, the solvent being devoid of substances forming an adhering residue. Alternatively, the solvent can be applied to that surface region of the strip which will subsequently be engaged on the flange.

Conveniently, to ensure that the solvent wets the flange uniformly and can be applied readily, the solvent contains a thickening agent such as the substance known under the registered trade mark of "Aerosil" or other substances which affect the consistency of the solvent in a required manner without leaving unsightly residues behind which stick tightly to the bodywork or strip. The substances may remain behind as a dusty layer which can readily be dusted off or which drops off on its own.

In the first place, the solvent facilitates the engagement of the strip on the flange by reducing friction. In the second place, the solvent causes a gradual softening or plasticization of the strip material in the region where the same is in clamped engagement with the flange. The depth of softening depends upon the duration of the treatment and the choice of material and leads to intimate engagement on the flange. The surface unevennesses which can be compensated for are greater in proportion as the softening proceeds deeper. It is usually desirable for the treatment time to be long, so that deep softening occurs with a correspondingly satisfactory adaptation of the strip to the flange surface, but the strip region near the surface must not become thinly viscous and start to run, for adhesion sufficient to secure the strip in its position on the flange should be ensured even while the solvent is acting.

It is usually preferred to apply the solvent to the flange since the same is more readily accessible than the strip inside surface and since application of the solvent to the flange ensures that the action of the solvent is limited substantially to those surface zones of the strip which engage on the flange, the other strip parts not coming into contact with the solvent and therefore retaining their original strength. In some cases, however, it may be advantageous to apply the solvent to the strip, for instance, if the solvent is required to act on the strip for some time before the strip is assembled.

Considerable dissolution of the surface region of the strip can help to provide an intimate joint between the strip and the flange surface. A joint of this kind, although preferred, is not absolutely necessary since even relatively little softening leads to an intimate adaptation of the shape of the strip surface to the minor unevennesses which are always present on the flange surface, so that an excellent joint is ensured without actual sticking.

The strip material can be softened on both sides of the flange by both sides thereof being wetted with the solvent and by both sides of the strip being prepared appropriately in the light of the material used for the strip. Preferably, however, solvent is applied just to one side of the flange. A one-sided application not only has almost the same effect as an application on both sides but also provides the advantage that, as a result of the direct contact between the strip and the flange on the unwetted side, the strip is retained reliably in the required position during assembly. In this event it is not even absolutely necessary to ensure that the softened material has hardened sufficiently until force can be applied to the strip either during further assembly of the vehicle or when the vehicle is in use.

As a rule, several hours elapse between the fitting of the strips to the vehicle and the end of the production line. This period of time is usually adequate for the solvent to dry to an extent such that, asssuming normal use of the vehicle, the strip does not move from its predetermined position. Sufficient time is therefore available to use a relatively slow-drying solvent having a correspondingly long period of activity. Consequently, softening can proceed to a relatively considerable depth if the material used for the surface of the strip is chosen appropriately, with the two results that the strip sticks to the flange satisfactorily and sealing-tightness is improved. An advantage of using a solvent which is relatively low in volatility is that it is easier to choose one which does not attack the surface layer of the flange, such layer being formed by the still recent paint of the bodywork.

An important advantage of the invention is that a sealing strip which is firmly fixed to the retaining flange has no tendency to shrink which in other cases often leads to the strip fitting badly on the flange, with the result that the strip remains in the required position for a long time. Also, vehicle bodywork may have to be given further heating after assembly of the strip in order to be repainted, and the reheating often causes the known sealing strips to work loose and drop off or shift. There is no risk of these disadvantages when the method according to the invention is used, since the solvent dries rapidly during heating, so that the joint between the strip and the flange becomes a firm one.

Conveniently, the strip region engaging the flange is grooved—i.e., roughened, more particularly by linear recesses, that solvent-receiving pockets or the like are formed therein.

Apart from the strip regions which are adjacent the flange and which the solvent is required to treat, sealing strips of the kind under consideration can be constructed in any way and made of any material. Preferably, they are made of elastomers or plastomers such as polyvinyl chloride. Polyvinylchloride can be surface-dissolved by particular solvents and so is often directly suitable for the performance of the method. Preferably, however, the strip surface which will subsequently engage on the flange is in the form of a coating of a material which can readily be surface-dissolved by the solvent, with the advantage that the coating can be applied to the strip material in conditions which are particularly advantageous for the connection to the parent material of the strip and which are, as a rule, different from the conditions obtaining during assembly of the strip. For instance, the coating can be extruded together with the parent material of the strip or be applied in a molten liquid or dissolved state to the cold or hot parent material of the strip. Another possibility then arising is that the solvent can be chosen not to attack the material of which most of the strip is made.

Once the joint between the strip and the flange is ready, security of retention is provided either not at all or not exclusively by the clamping force of the strip. However, the quality of this connection and, in particular, the sealing-tightness of the connection depend upon the clamping force of the strip while its surface layer is soft. The strip must therefore have provision for producing sifficient clamping force; conveniently, such provision can take the form of known resilient metal inserts. However, since, as just stated, the clamping force is required only during the softening and, where applicable, setting time of the strip surface layer being stuck to the flange, the provision for producing the clamping force can take the form of plastics cross-sectional members of the sealing strip, elements which, since they become fatigued, have previously been regarded as unsuitable to produce the clamping force. However, fatigue is not disadvantageous for the purposes of the invention provided that it takes effect only after the softening and, where applicable, curing time of the surface-dissolved cross-sectional members. The sealing strip can therefore be produced without any metal inserts and it is sufficient if the strip comprises a cross-sectional member which produces a clamping force at least briefly as a result of resilient deformation and which, conveniently, is a thermoplastics so that it can be produced cheaply and possibly extruded together with the other cross-sectional member of the strip.

Similar considerations apply to the material used for the shaped members which engage on the flange and which are usually in the shape of lips so as to be able to compensate for tolerances and transmit the clamping force resiliently for a prolonged period of time. For the purposes of the invention, the long-term resilience of such members need not be of a very high standard.

A large number of polymeric substances which can be softened readily by a solvent in the sense of the invention in order to enter into a stuck joint with the retaining flange are available, but not all of them are likely to provide a stuck or welded joint of adequate strength with the parent material, as a rule polyvinylchloride (PVC), of the sealing strip. It may therefore be convenient if the strip members which will co-operate with the flange engage positively with the parent member of the strip.

The invention will be described in greater detail hereinafter with reference to the drawings which show advantageous embodiments of the sealing strip and in which.

Figure 1:
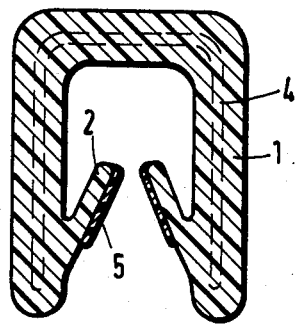
FIG. 1 is a cross-section through a first embodiment of an edge protection strip having a steel insert.

Each of the three sealing strips, shown as edge protection strips, comprise in known manner a channel-section parent or basic member made e.g. of hard polyvinyl chloride, inwardly directed retaining elements being disposed on the member within the space bounded by the arms of the parent member. The retaining elements of the first two embodiments are in the form of clamping lips 2, 3; when the strip is pushed on to a retaining flange, the lips 2, 3 deform resiliently and engage clampingly with the flange. The third embodiment comprises a clamping lip 6 and on the opposite side a small sealing lip 7 and two groups 8 of grooves or low longitudinal ribs. The large lip 6 serves to produce a clamping force by resilient deformation and the lip 7 and grooving 8 are intended to increase adhesion with the flange. The parent member 1 of the first embodiment and third embodiment comprises a steel insert 4 which increases the clamping force, but the parent member 1 of the embodiment shown in FIG. 2 is devoid of any such insert and, as a result of the material and cross-section selected for it, can itself produce the clamping force at least for a time sufficient for a bond to develop between the strip and the flange.

The lips 2 of the embodiment of FIG. 1 are made of substantially the same material as the parent member 1. If required they can be made of a different and preferably softer material which is extruded together with the parent member and welded thereto. Those surfaces of the lips 2 which are near the flange have a coating 5 of a plastics which bonds satisfactorily with the material of the lips 2 and which is surface-dissolved to such an extent, by the solvent which is applied to the flange before assembly, as to soften, be engaged intimately with the flange surface by the clamping force when softened and therefore enter into a relatively strong stuck joint, with the result that security of retention and sealing-tightness are improved. The coating 5 can be extruded together with the lips 2 or can be applied thereto subsequently by any required process. The thickness of the coating 5 is preferably of the order of from 0.001 to 0.8 mm.

Figure 2:
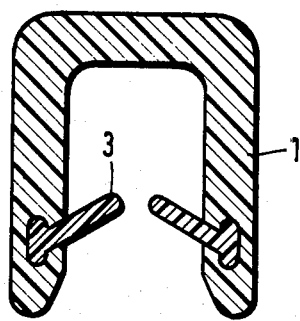
FIG. 2 shows a second embodiment of similar cross-section but without a steel insert and with the lips secured positively in the parent member of the strip.
Figure 3:
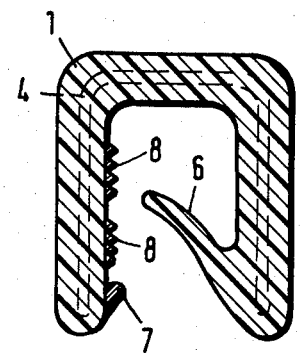
FIG. 3 shows a third embodiment having only one lip.
Figure 4:
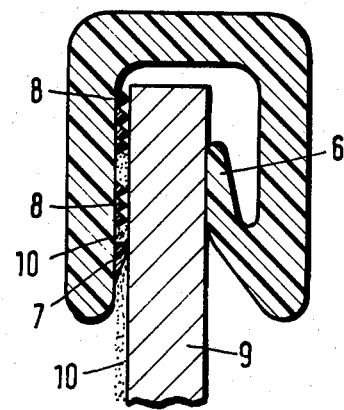
FIG. 4 shows the third embodiment engaged on a retaining flange.

The lips 3 of the embodiment shown in FIG. 2 are made entirely of a material which the solvent can soften and which is engaged positively in the parent member 1 for improved engagement therein. The member 1 and the lips 3 can be extruded together; alternatively, the lips can be introduced into the member 1 subsequently. The section shapes shown in the drawings can be used as retaining shapes for sealing strips or the like connected to them. The clamping lip 6 of the third embodiment is made of the same substance as the parent member 1 but the sealing lip 7 and the ribs 8 are made of the material which the solvent can dissolve superficially. When the sealing strip shown in FIG. 4 is pushed on to a retaining flange 9, one side of which has been treated with a coating 10 of solvent, the solvent wets the part 7, 8 of the strip as well and is caught to some extent therebetween. The solvent diffuses into the members 7, 8 and softens the same so that the same stick to the flange surface or at least are adapted accurately to the shape of such surface, with a consequent considerable increase in their adhesion. However, the solvent pentrates little, if at all, into the substance of the parent member, which therefore retains its strength. Solvent is not applied to the other side of the flange so that the lip 6 retains its strength and resilience to keep the sealing strip in the required position until the solvent has dried sufficiently. The solvent which is present on the flange outside the strip disappears as it dries and does not leave any sticky residue behind.

Polyvinylbutyral in association with an alcohol, e.g. isopropanol, a solvent, is an example of a material suitable for those parts of the sealing strip whose surface the solvent is required to dissolve. The lips can be made of cellulose acetate, in which event they can be correspondingly thinner because of the relatively considerable hardness of cellulose acetate. A ketone-ester mixture is a suitable solvent in this case. Other possible combinations of substances are ethylene vinyl acetate copolymer with an aromatic ketone mixture as solvent, and polyurethane with a ketone-ester mixture as solvent. Both of the synthetic resins mentioned can be extruded together with polyvinyl chloride (as the material used for the parent member).

Conveniently, to facilitate the brushing of the solvent on to the flange, the solvent is thickened to a thixotropic consistency, e.g. by means of silicic acid in powder form as sold commercially under the "Aerosil" trade mark. The term "solvent" as used in the foregoing is intended to cover such a thickened solvent. A thickening agent is left behind as a dust which can be wiped off, or else it drops off when the solvent has evaporated.

I claim:

1. A method for improving the adherence of a sealing strip onto a retaining flange in which the sealing strip has a self-clamping channel-section body portion of a first material upon which a solvent has little if any dissolving effect comprising the steps of:

securing, onto the body portion, flange engaging surfaces of a second material upon which the solvent has a greater dissolving effect;

applying the solvent on one of the flange or flange engaging surfaces; and mounting the sealing strip onto the flange whereby the solvent in engagement with the flange engaging surfaces produces surface or shallow dissolution therein for adhereing the flange engaging surfaces to the flange, the solvent further engaging the body portion slightly if at all so as to have little if any dissolving effect on the body portion which thereby retains its full clamping strength.

2. A method according to claim 1 wherein the sealing strip has a resilient lip for clamping the flange which is made of the first material whose surface the solvent can dissolve little, if at all, and the lip has a coating of the second material whose surface the solvent can dissolve.

3. A method according to claim 1 wherein the flange engaging surfaces of the strip are provided with solvent receiving pockets or recesses.

4. A method according to claim 1 wherein the strip has a metal insert embedded therein to produce the clamping force retaining the strip on the flange during the strip mounting step.

5. A method according to claim 1 wherein the channel-section body portion has a portion thereof made from a thermoplastic material that produces at least briefly a clamping force when the strip is resiliently deformed during the strip mounting step.

6. A method according to claim 1, wherein the solvent is devoid of substances forming an adhering residue on the flange.

7. A method according to claim 1, wherein the second material forming the flange engaging surfaces is a polyvinylbutyral material.

8. A method according to claim 1, wherein the second material forming the flange engaging surfaces is a cellulose acetate material.

9. A method according to claim 1, wherein the second material forming the flange engaging surfaces is an ethylene vinyl acetate copolymer material.

10. A method according to claim 1, wherein the second material forming the flange engaging surfaces is a polyurethane material.

11. A method according to claim 1, wherein the solvent contains a thickening agent.

12. A method according to claim 11, wherein the solvent is slow-drying.

13. A method according to claim 11, wherein the solvent has little, if any, dissolving effect on the surface layer of the flange.

* * * * *